(12) United States Patent
Iida et al.

(10) Patent No.: US 6,233,831 B1
(45) Date of Patent: May 22, 2001

(54) DUST COLLECTOR-EQUIPPED POWER CUTTER

(75) Inventors: Giichi Iida; Hirofumi Yamami; Fujio Kobayashi, all of Tokyo (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 09/136,742

(22) Filed: Aug. 19, 1998

(30) Foreign Application Priority Data

Aug. 27, 1997 (JP) ..................................... 9-230926

(51) Int. Cl.⁷ ....................................................... B25F 3/00
(52) U.S. Cl. ................................................. 30/124; 30/133
(58) Field of Search .............................. 30/124, 125, 133, 30/391; 451/456

(56) References Cited

U.S. PATENT DOCUMENTS

| | | | |
|---|---|---|---|
| 1,990,991 | * | 2/1935 | Heubach .............................. 30/124 X |
| 2,552,747 | * | 5/1951 | Strimple et al. .................. 192/105 D |
| 2,640,304 | * | 6/1953 | McEwan ................................ 451/456 |
| 3,711,946 | * | 1/1973 | Troutman ................................ 30/124 |
| 3,945,478 | * | 3/1976 | Kellerman et al. ........... 192/105 CD |
| 5,033,192 | * | 7/1991 | Franz et al. ............................. 30/124 |
| 5,074,044 | | 12/1991 | Duncan et al. ......................... 30/124 |
| 5,088,197 | * | 2/1992 | Anderson ................................ 30/124 |
| 5,445,056 | * | 8/1995 | Folci ....................................... 30/391 |
| 5,862,594 | * | 1/1999 | Soderqvist ............................. 30/391 |
| 5,890,292 | * | 4/1999 | Stark et al. ............................. 30/124 |

FOREIGN PATENT DOCUMENTS 6-79520  *  3/1994 (JP) ........................................ 30/390

* cited by examiner

Primary Examiner—Rinaldi I. Rada
Assistant Examiner—Omar Flores-Sánchez
(74) Attorney, Agent, or Firm—Baker Botts L.L.P.

(57) ABSTRACT

A dust collector-equipped power cutter includes a prime mover, a cutter, a dust-sucking fan, and a belt-driven power transmission mechanism for transmitting rotation from the prime mover to the cutting disk and to the dust-sucking fan. The belt-driven power transmission mechanism is constructed such that the rotation of the prime mover is transmitted through a single belt to a cutter-driving pulley for the cutting disk and to a fan-driving pulley for the dust-sucking fan.

6 Claims, 4 Drawing Sheets

DUST COLLECTOR-EQUIPPED POWER CUTTER

BACKGROUND OF THE INVENTION

The present invention relates to a dust collector-equipped power cutter, and in particular to a power transmission mechanism for a portable type dust collector-equipped power cutter that includes a cutting disk and a dust-sucking fan that are driven by a prime mover.

A conventional portable type dust collector-equipped power machine of this kind, which is currently produced, is generally constituted by a main body provided with a prime mover, such as a small air-cooled two stroke internal combustion engine or an electric motor, a cutting head portion having a cutting disk that is rotated by the prime mover and having a safety cover, and a dust-sucking fan attached to the safety cover for sucking dust from the site of the cutting and discharging dust generated by the power cutter when it is operated.

In the conventional portable type dust collector-equipped power cutter of the aforementioned type, the speed of rotation of the prime mover is reduced before it is transmitted to the cutting disk, thereby to rotate the cutting disk at a lower rotational speed than the rotational speed of the prime mover, and at the same time, the reduced speed of the prime mover is taken off so as to transmit it to the dust-sucking fan, thereby to rotate the dust-sucking fan. Therefore, the speed of rotation of the dust-sucking fan tends to become slow, thus making it difficult to achieve a sufficient dust-sucking capability of the dust-sucking fan.

With a view to overcoming the problem mentioned above, the owner of the present invention has previously proposed in Japanese Patent Application No. H9-30786 (Japanese Patent Laid-Open Publication 10-225925) a dust collector-equipped power cutter which provides rotation of the dust-sucking fan thereof at high speed. In that dust collector-equipped power cutter the output shaft of a prime mover is operably connected with a centrifugal clutch having a clutch drum to which a pulley of smaller diameter as well as a pulley of larger diameter are integrally formed such that, by means of the prime mover, the cutting disk can be rotated through a combination of the aforementioned smaller pulley and a first belt at a lower speed, and at the same time, the dust-sucking fan can be rotated through a combination of the aforementioned larger pulley and a second belt at a higher speed. According to this structure, the dust-sucking fan of the dust collector-equipped power cutter rotates at a higher speed, thereby enhancing the suction force of the dust-sucking fan and hence enabling the dust generated by the operation of the cutting disk to be sufficiently sucked away from the cutting site and discharged.

However, since the rotation from the output shaft of the prime mover is individually transmitted to the cutting disk and to the dust-sucking fan through a combination of the aforementioned smaller pulley and a first belt, and through a combination of the aforementioned larger pulley and a second belt, respectively, the number of parts for the power transmitting mechanism required between the output shaft of the prime mover and the cutting disk or the dust-sucking fan is inevitably increased and hence the layout and construction of the parts is rather complicated, thus leading to an increase in manufacturing cost of the entire transmission mechanism as well as in the cost of assembling it.

SUMMARY OF THE INVENTION

An object of the present invention is to provide a dust collector-equipped power cutter wherein the power transmitting mechanism from the prime mover to the cutting disk and to the dust-sucking fan can be simplified, thereby enabling the power cutter to become compact in structure as a whole.

With a view to attaining the aforementioned object, the present invention provides a dust collector-equipped power cutter which comprises a prime mover, a cutter, a dust-sucking fan, and a belt-driven power transmission mechanism for transmitting revolving power from the prime mover to the cutting disk and to the dust-sucking fan. The belt-driven power transmission mechanism is constructed such that the rotation of the prime mover is transmitted through a single belt to a cutter-driving pulley for the cutting disk and to a fan-driving pulley for the dust-sucking fan.

In a preferred embodiment, a dust collector-equipped power cutter includes a prime mover having an output shaft, a centrifugal clutch operably connected with the output shaft of the prime mover and having a pulley portion constituted by a boss portion of a clutch drum of the clutch, a cutting disk, and a dust-sucking fan having a fan-driving pulley fixed externally to a driving shaft of the dust-sucking fan. A belt-driven power transmission mechanism for transmitting rotation from the prime mover to the cutting disk and to the dust-sucking fan is composed of an intermediate relay double pulley for the cutting disk, and a single belt, preferably a V-ribbed belt, that is wound around the pulley portion, the fan-driving pulley and the intermediate relay double pulley.

In another embodiment, an impeller is attached to the driving shaft of the dust-sucking fan, and a timing belt is wound around a smaller pulley portion of the intermediate relay double pulley and a final pulley which is attached to one end portion of a cutting disk-driving shaft that fixedly carries the cutting disk at the other end portion thereof.

In a further embodiment, the diameter of pulley portion of the centrifugal clutch is larger than the diameter of the fan-driving pulley but smaller than the diameter of a larger pulley portion of the intermediate relay double pulley, and the diameter of the smaller pulley portion of the intermediate relay double pulley is smaller than the diameter of the final pulley.

In a dust collector-equipped power cutter of this invention, which is constructed as described above, since the belt-driven power transmission mechanism for transmitting rotation from the prime mover to the cutting disk and to the dust-sucking fan is constructed such that the rotation is transmitted from the pulley of the prime mover through a single V-ribbed belt to a cutter-driving pulley for the cutting disk and to a fan-driving pulley for the dust-sucking fan, the power transmitting mechanism can be simplified, thus making it possible to reduce the number of parts as compared with the conventional power transmitting mechanism and to simplify the layout of the power transmitting mechanism thereby saving the cost for manufacturing and assembling the transmission mechanism as a whole.

Further, although the fan-driving pulley and the intermediate relay double pulley are designed to be rotated using a single V-ribbed belt, the diameters of both the fan-driving pulley and the intermediate relay double pulley are made different, respectively, from the diameter of the pulley of the prime mover so as to rotate the fan-driving pulley at a higher speed and at the same time, to rotate the intermediate relay double pulley at a lower speed, whereby the speeds of rotation of both the dust-sucking fan and cutting disk can be easily set to suitable levels, respectively, for optimum operations thereof.

DESCRIPTION OF THE EMBODIMENT

One embodiment of a dust collector-equipped power cutter according to this invention will be explained in detail below with reference to the drawings.

Figure 1:
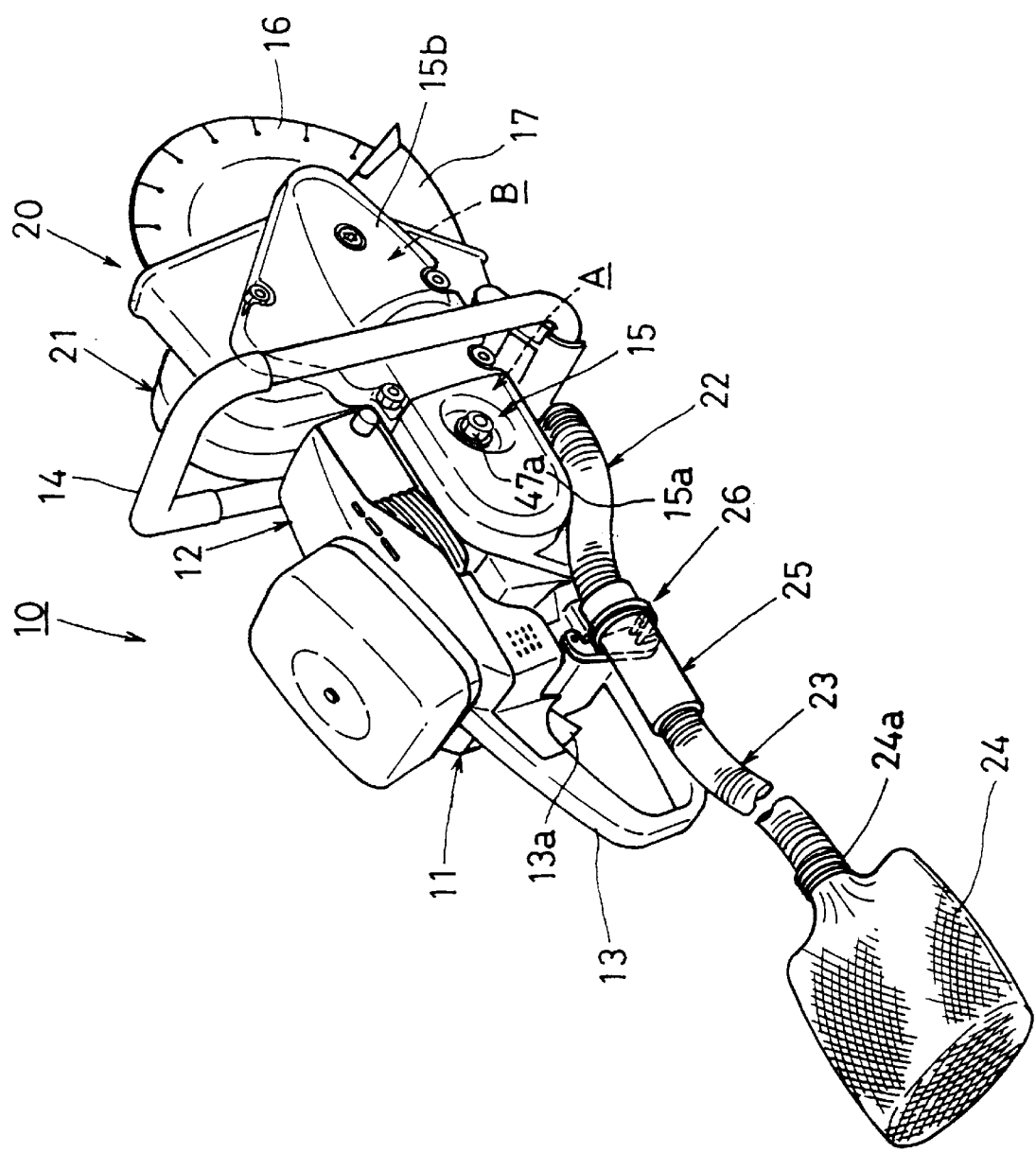
FIG. 1 is a perspective view generally illustrating a dust collector-equipped power cutter according to one embodiment of this invention.

FIG. 1 shows a perspective view illustrating an entire structure of a dust collector-equipped power cutter or so-called engine cutter according to this embodiment.

The engine cutter 10 shown in FIG. 1 comprises a main body 12 having a central portion, on which a small air-cooled two-stroke gasoline internal combustion engine (hereinafter referred to as an internal combustion engine) 11 is mounted as a prime mover. A rear handle 13 provided with a throttle trigger 13a and extending in the longitudinal direction of the engine cutter 10 is attached to the rear side of this main body 12. Further, a front handle 14 extending upwardly from the opposite lower sides of the central portion of the main body 12 so as to surround the upper portion of the main body 12 is attached to the main body 12.

The main body 12 is further provided with a cutting disk 16 that is rotated by the internal combustion engine 11 through belt-driven power transmission devices A and B (to be explained in detail hereinafter) installed in a transmission case 15, and with a working head portion 20 comprising a safety cover 17 encasing part of the cutting edge portion together with portions of both sides of the cutting disk 16 so as to form a dust passage between the safety cover 17 and the cutting disk 16. A centrifugal fan (a dust-sucking device) 21 for sucking dust, which is driven by the internal combustion engine 11 through the belt-driven power transmission device A, is attached to one side wall of the safety cover 17 secured to the working head portion 20.

To the dust-discharging portion 21a (FIG. 2) of the centrifugal fan 21 is fixed the proximal end portion (upstream side) of a flexible dust hose 22. The distal end portion (downstream side) of the dust hose 22 is received in a rigid hose connector 25 so as to be fixed thereto. The hose connector 25 is removably attached to the main body 12 by means of a hose fixture 26 and is connected to the proximal end portion of a flexible dust hose 23, the free end portion of which extends rearwardly of the engine cutter 10 and is connected with a dust bag 24, which is made of an air permeable material such as an air permeable cloth. The dust bag 24 is removably connected, through a rotatable universal joint 24a of one-touch type, to the dust hose 23.

Figure 2:
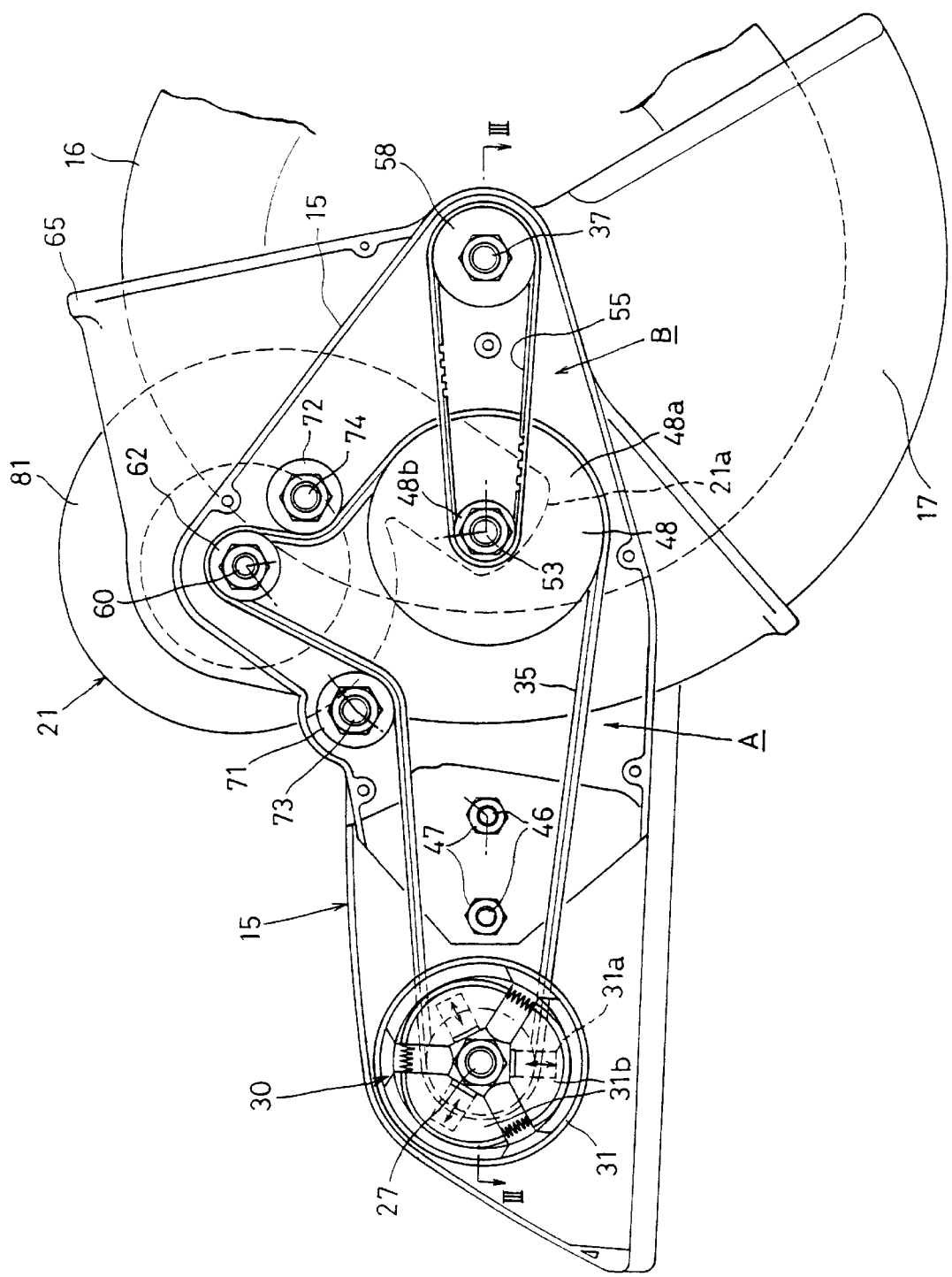
FIG. 2 is a side view of a transmission case wherein the cover thereof is removed to show the dust-sucking fan and the belt-driven power transmission mechanism for the cutting disk of the dust collector-equipped power cutter shown in FIG. 1.
Figure 3:
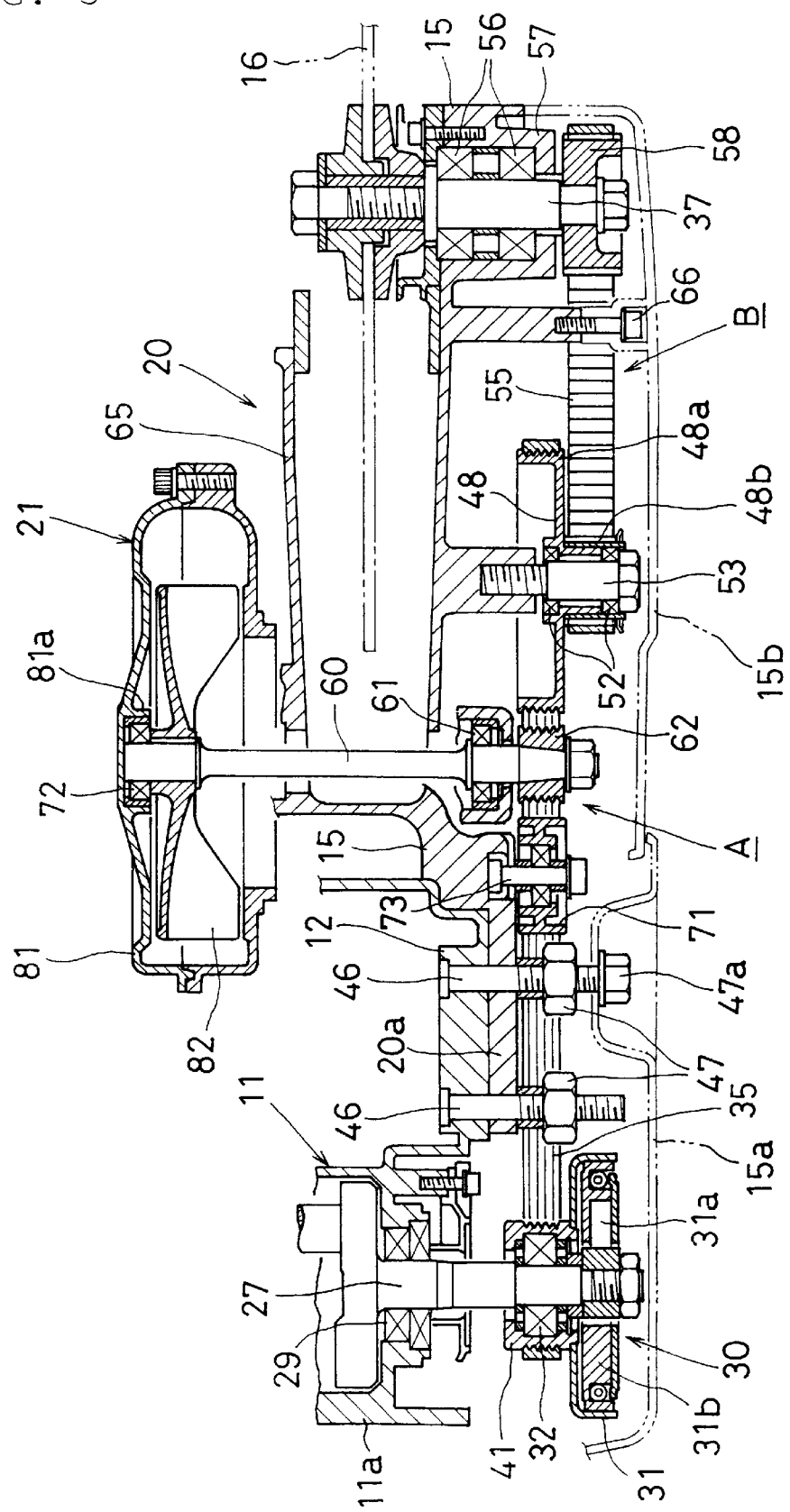
FIG. 3 is a cross-sectional view taken along the line III—III of FIG. 2.
Figure 4:
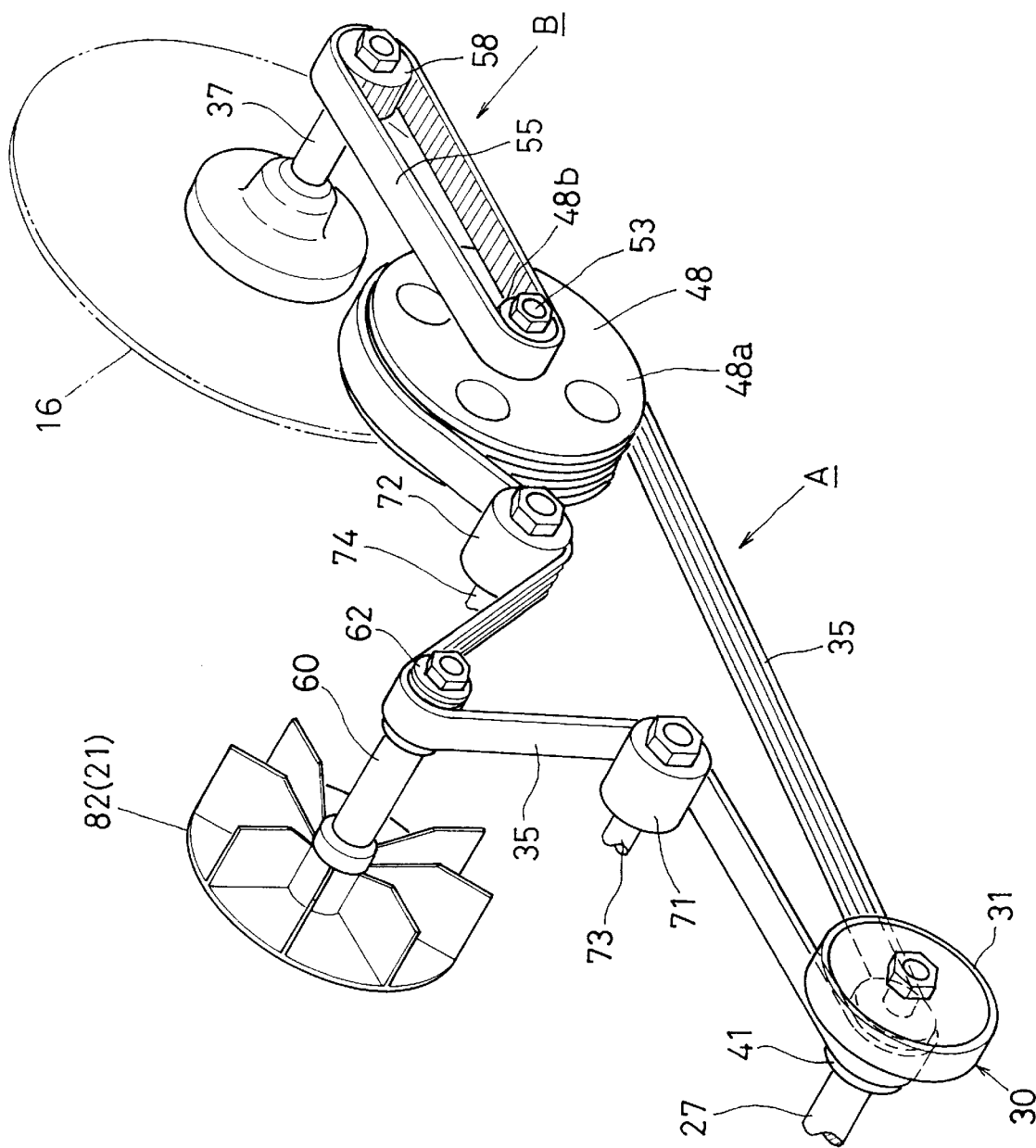
FIG. 4 is a perspective view schematically illustrating the belt-driven power transmission mechanism shown in FIG. 2.

FIG. 2 shows the interior of transmission case 15 as the cover portions 15a and 15b thereof are removed therefrom, thereby to illustrate the belt-driven power transmission devices A and B housed therein. FIG. 3 shows a cross-sectional view taken along the line III—III of FIG. 2, and FIG. 4 shows a perspective view schematically illustrating the belt-driven power transmission devices A and B.

A crank shaft (output shaft) 27 is axially secured through a ball bearing 29 to the crank case 11a of the internal combustion engine 11. A centrifugal clutch 30, which may be of any suitable, well-known structure, is mounted on the outer end portion of the crank shaft 27.

The centrifugal clutch 30 is provided with a clutch drum 31 and a grooved pulley portion 41 constituting a boss portion of the clutch drum 31, the pulley portion 41 being formed integrally with the clutch drum 31. A clutch hub 31a formed inside the clutch drum 31 is fastened to the crank shaft 27 and is provided with three clutch shoes 31b, each being movable in the radial direction.

A ball bearing 32 is interposed between the pulley portion 41 and the crank shaft 27. When the centrifugal clutch 30 is rotated, the clutch shoes 31b in the clutch drum 31 are forced to move outward radially from the clutch hub 31a so as to engage the inner peripheral wall of the clutch drum 31, thereby transmitting the rotation from the crank shaft 27 to the pulley portion 41 through the clutch hub 31a, the clutch shoes 31b and the clutch drum 31.

The working head portion 20 is fixedly attached to the main body 12, and also the transmission case cover 15a is attached to the main body 12 in such a manner as to cover the centrifugal clutch 30. The rear portion 20a (transmission case 15) of the working head portion 20 and the transmission case cover 15a are clamped to each other by means of stud bolts 46 installed on the main body 12 and locknuts 47 and 47a so as to be removably attached to the main body 12.

The working head portion 20 is constituted by a box-like transmission case 15, a transmission case cover 15b that is attached to the transmission case 15 by means of bolts 66, etc., and a safety cover 65. The transmission case 15 is integrally connected with the safety cover 65 on one side thereof which is opposite to where the transmission case cover 15b is disposed. The cutting disk 16 is positioned in the middle of the space formed inside the safety cover 65. The dust-sucking fan 21 is disposed on one side of the safety cover 65, which is opposite to where the transmission case 15 is located.

Between the main body 12 and the transmission case 15 of the working head portion 20, there is provided the belt-driven power transmission device A, including the pulley portion 41 of the centrifugal clutch 30, which is designed to transmit the rotation of the internal combustion engine 11 to the cutting disk 16 and to the dust-sucking fan 21.

The details of this belt-driven power transmission device A are as follows. The belt-driven power transmission device A is essentially composed of the pulley portion 41 of the centrifugal clutch 30, a grooved larger pulley portion 48a of the intermediate relay double pulley 48, which is externally fitted, through ball bearings 52, and a relay shaft 53 fixed by a threaded connection to the transmission case 15, a grooved fan-driving pulley 62, which is externally fixed to one end portion of a dust-sucking fan shaft 60 axially supported through a ball bearing 61 on the transmission case 15, and a V-ribbed belt 35 having a relatively large width, which is trained around the pulley portion 41 of the centrifugal clutch 30, the larger pulley portion 48a of the intermediate relay double pulley 48, and the grooved fan-driving pulley 62.

As shown in FIG. 2, the V-ribbed belt 35 is pushed from outside by a pair of idling tension pulleys 71 and 72 disposed respectively on both sides of the fan-driving pulley 62, thus suitably tensioning the V-ribbed belt 35. The tension pulleys 71 and 72 are rotatably and axially supported, respectively, in such a manner that at least one of the tension pulleys 71 and 72 is biased by means of a suitable biasing means such as a spring (not shown), thus being made movable toward the V-ribbed belt 35. Since these tension pulleys 71 and 72 are disposed to push the V-ribbed belt 35 from outside, the frictional contact area among the V-ribbed belt 35, the pulley portion 41 of the centrifugal clutch 30, the larger pulley portion 48a of the intermediate relay double pulley 48 and the grooved fan-driving pulley 62 can be increased and at the same time, the driving force of the transmission device A can be increased due to a suitable tensioning of the V-ribbed belt 35.

The belt-driven power transmission B is consists of a toothed smaller pulley portion 48b, a final toothed pulley (cutter-driving pulley) 58, which is externally fitted on and fixed to a driving shaft 37 on which the cutting disk 16 is mounted axially supported through ball bearings 56 by a bearing portion 57 formed at the distal end portion of the transmission case 15, and a toothed timing belt 55 which is trained around the smaller pulley portion 48b and the final pulley 58. The smaller pulley portion 48b has a smaller diameter than that of the aforementioned larger pulley portion 48a of the intermediate relay double pulley 48. The cutter-driving pulley 58 has a larger diameter than that of the aforementioned smaller pulley portion 48b.

The end portion of the dust-sucking fan shaft 60 opposite from the end portion that is supported by the transmission case 15 is axially and rotationally supported by a ball bearing 72 on a bearing portion 81a formed in a fan case 81 of the dust-sucking fan 21. An impeller 82 is disposed inside the fan case 81 and is fixedly attached to the dust-sucking fan shaft 60.

The rotation of the internal combustion engine 11 is transmitted from the pulley portion 41 of the centrifugal clutch 30 through the V-ribbed belt 35 to the grooved fan-driving pulley 62 and to the intermediate relay double pulley 48. The rotation transmitted to the grooved fan-driving pulley 62 is then transmitted through the dust-sucking fan shaft 60 to the impeller 82 of the dust-sucking fan 21 so as to rotate the impeller 82. Since the diameter of the grooved fan-driving pulley 62 is made smaller than the diameter of the pulley portion 41 of the centrifugal clutch 30, the speed of rotation of the grooved fan-driving pulley 62 can be made higher than the speed of rotation of the internal combustion engine 11, so that the impeller 82 of the dust-sucking fan 21 can be rotated at an increased speed.

The rotation transmitted to the intermediate relay double pulley 48 is transmitted through the smaller pulley portion 48b of the intermediate relay double pulley 48, the toothed timing belt 55, the final pulley 58 and the driving shaft 37 to the cutting disk 16, thereby to rotate the cutting disk 16. Since the diameter of the larger pulley portion 48a of the intermediate relay double pulley 48 is made larger than the diameter of the pulley portion 41 of the centrifugal clutch 30, and at the same time, since the diameter of the final pulley 58 is made larger than the diameter of the smaller pulley portion 48b of the intermediate relay double pulley 48, the speed of rotation of the cutting disk 16 is less than that of the internal combustion engine 11.

The portable dust collector-equipped power cutter 10 described above transmits the driving force from the engine 11 to the dust-sucking fan 21 and to the cutting disk 16 using a single V-ribbed belt 35, which is adapted to simultaneously transmit the driving force from the pulley portion 41 formed integrally with the clutch drum 31 of the centrifugal clutch 30 to the fan-driving pulley 62 for the dust-sucking fan 21 and to the intermediate relay double pulley 48 for the cutting disk 16. The power transmitting mechanism can be simplified, thus making it possible to reduce the number of parts as compared with the conventional power transmitting mechanism and to simplify the layout of the power transmitting mechanism, thereby saving the cost for manufacturing and assembling the transmission mechanism as a whole.

Further, although the fan-driving pulley 62 and the intermediate relay double pulley 48 are designed to be rotated using a single V-ribbed belt 35, the diameters of both fan-driving pulley 62 and the intermediate relay double pulley 48 are made different, respectively, from the diameter of the pulley portion 41 of the centrifugal clutch 30, thereby making it possible to rotate the fan-driving pulley 62 at a higher speed and at the same time, rotate the intermediate relay double pulley 48 at a lower speed. As a result, the speeds of both the dust-sucking fan 21 and the cutting disk 16 can be readily set to optimum values for best operation.

Since the adjustment in tension of the V-ribbed belt 35 is designed to be performed using a pair of the tension pulleys 71 and 72, and at the same time, the power transmission to the cutting disk 16 is designed to be performed using the timing belt 55 in the aforementioned embodiment, the distances between the axes of the output shaft 27, the relay shaft 53 and the cutter-driving shaft 37 are not required to be changed for adjusting the belt tension, thus making it possible to form the transmission case as an integral body and hence to enhance the mechanical strength thereof.

In the foregoing explanation, the present invention has been explained with reference to one embodiment. However, the present invention should not be construed to be limited by this embodiment, but may be variously modified within the spirit of this invention claimed in the appended claims.

For example, although a pair of tension pulleys 71 and 72 are employed in the above embodiment, the number of tension pulley can be reduced to only one by suitably selecting the layout of the constituent members.

As is apparent from the foregoing explanation, since the transmission of rotation from the engine to the dust-sucking fan and to the cutting disk is effected using a single V-ribbed belt in the dust collector-equipped power cutter according to this invention, the power transmitting mechanism from the internal combustion engine to the dust-sucking fan and to the cutting disk can be simplified and at the same time, an increase in the speed of rotation of the dust-sucking fan and a decrease in the speed of rotation of the cutting disk can be provided with the simplified transmission.

What is claimed is:

1. A dust collector-equipped power cutter comprising
   a prime mover having an output shaft,
   a centrifugal clutch operably connected with the output shaft of the prime mover and having a pulley portion constituted by a boss portion of a clutch drum of the clutch,
   a cutting disk,
   a dust-sucking fan having a fan-driving pulley fixed externally to a driving shaft of the dust-sucking fan,
   and a belt-driven power transmission mechanism for transmitting rotation from the prime mover to the cutting disk and to the dust-sucking fan, the belt-driven power transmission mechanism including an intermediate relay double pulley for the cutting disk and only one belt driven by the prime mover, said one belt being wound around the pulley portion of the centrifugal clutch, the fan-driving pulley, and the intermediate relay double pulley, and the intermediate relay double pulley for the cutting disk and the fan-driving pulley of the dust-sucking fan being driven solely and exclusively by said one belt, wherein said only one belt is externally tensioned by means of a pair of tension pulleys disposed on both sides of said fan-driving pulley, and wherein a timing belt is trained partway around a smaller pulley portion of the intermediate relay double pulley and a final pulley that is attached to one end portion of a cutting disk-driving shaft fixedly carrying the cutting disk at the other end portion thereof.

2. The dust collector-equipped power cutter according to claim 1, wherein said single belt is a V-ribbed belt.

3. The dust collector-equipped power cutter according claim 2, wherein said V-ribbed belt is externally tensioned by means of a pair of tension pulleys disposed on both sides of said fan-driving pulley.

4. The dust collector-equipped power cutter according to claim 1, wherein an impeller is attached to the driving shaft of the dust-sucking fan.

5. The dust collector-equipped power cutter according to claim 4, wherein the diameter of pulley portion of the centrifugal clutch is larger than the diameter of the fan-driving pulley but smaller than the diameter of a larger pulley portion of the intermediate relay double pulley.

6. The dust collector-equipped power cutter according to claim 4, wherein the diameter of the smaller pulley portion of the intermediate relay double pulley is smaller than the diameter of the final pulley.

* * * * *